United States Patent [19]

Jasniewski

[11] Patent Number: 4,543,053

[45] Date of Patent: Sep. 24, 1985

[54] TOOL FOR FORMING A FOLDED PASTRY

[76] Inventor: Henry E. Jasniewski, 5042 N. Parkside, Chicago, Ill. 60630

[21] Appl. No.: 583,682

[22] Filed: Feb. 27, 1984

Related U.S. Application Data

[63] Continuation-in-part of Ser. No. 340,273, Jan. 18, 1982, abandoned.

[51] Int. Cl.$^4$ .............. A21C 11/10; B26B 27/00; B29C 27/00; B29C 15/00
[52] U.S. Cl. .................................. 425/289; 30/130; 30/301; 30/316; 99/450.4; 99/450.5; 156/515; 425/298; 425/304; 425/383; 426/502; 426/503
[58] Field of Search ............... 425/289, 298, 304, 383; 30/130, 314, 315, 316, 301; D7/43, 44; 156/515; 99/450.4, 450.5; 426/502, 503, 512

[56] References Cited

U.S. PATENT DOCUMENTS 1,109,783  9/1914  Putnam .................................. 30/316
2,373,182  4/1945  Gamache .............................. 30/316

FOREIGN PATENT DOCUMENTS 840057  7/1960  United Kingdom ................. 30/316

Primary Examiner—Willard E. Hoag
Attorney, Agent, or Firm—Jenner & Block

[57] ABSTRACT

A tool for forming a folded pastry from rolled-out dough. The pastry tool includes a frame having an edge for cutting the dough, the cutting edge being formed in the shape of the peripheral outline of a pair of circles intersecting at two points. The two points of intersection define a line along which the dough, cut out by the tool, may be folded. Further, one of the circular sections of the frame is made larger than the other of the circular sections to allow that portion of the dough formed by the larger of the circular frame sections to overlap the smaller circular section of dough while accommodating a filling therebetween. The pastry tool also includes a sealing flange extending inwardly from said frame a distance above the cutting edge to simultaneously seal and trim two layers of dough.

10 Claims, 6 Drawing Figures

TOOL FORMING A FOLDED PASTRY

This application is a continuation in part of application Ser. No. 340,273 filed Jan. 18, 1982, now abandoned.

TECHNICAL FIELD

The present invention relates to a pastry tool and more particularly to a tool for forming a folded pastry from rolled-out dough.

BACKGROUND OF THE INVENTION

Folded pastries such as Polish pierogi, Cornish pasties, and the like are very difficult to make. In order to form the pastry, a circular cutter is typically employed to cut out a pastry shell from rolled-out dough. A spoonful of filling is placed in the middle of the circular shell and the shell is folded over the filling with the edges of the shell being coincident to form a semicircular rim consisting of two layers of dough. The pastry shell is typically sealed by pressing the two layers of dough forming the rim together using one's fingers. After the shell is sealed, any unwanted, excess dough is trimmed from the rim and the pastry is ready for cooking. This method is very time-consuming and typically does not result in pastries of uniform size or shape. Further, a novice cook may not effect a good enough seal to hold the pastry together during cooking. A bad seal can be disastrous. For example, a pierogi is typically cooked in boiling water. If the pastry rim is not sufficiently sealed, the pierogi will burst while cooking. This results not only in a mess, but further wastes the dough and filling which can no longer be reworked. In order to ensure a good seal, some cooks use a thicker dough and further form a wide rim. However, thick shells and wide rims are undesirable in some folded pastries.

Circular cutters have been known to include a sealing flange. Such cutters simultaneously cut and seal two layers of dough to form a sandwiched pastry. These cutters, however, have been found unsuitable for use in forming a folded pastry. One of the problems in using such a cutter to form a folded pastry is caused by the positioning of the filling on the shell. Typically, when a circular cutter is used, the filling is placed in the center of the shell as described above. The shell is then folded by bringing the edge of one half of the circular shell and the edge of the other half of the circular shell together with one's fingers, sealing the edges while folding. This method eliminates the need to use the sealing flange of the cutter since sealing of the pastry is done at the same time that the pastry shell is folded. Further, each half of the pastry shell formed by this method is rounded, making sealing of the pastry with known cutters having a sealing flange very difficult. When using a circular cutter, the filling may also be placed on one half of the circular shell so that the other half of the shell may be folded over the filling to form the top of the shell. In order to accommodate the filling, the shell half, which is folded over the filling, must be stretched so that its edge is coincident with the edge of the shell half underlying the filling for sealing. This method results in a pastry shell of un-uniform thickness which is undesirable. Further, because the top half of the shell must be stretched so that the edge of this portion of the shell is coincident with the edge of the lower portion of the shell, it is easier to seal the shell while stretching it by using one's fingers than it is to use the sealing flange of the circular cutter.

DISCLOSURE OF THE INVENTION

In accordance with the present invention, the disadvantages of prior pastry tools for forming a folded pastry have been overcome.

The pastry tool of the present invention includes a frame having an edge for cutting rolled-out dough, the cutting edge being formed in the shape of the peripheral outline of a pair of circles intersecting at two points. The two points of intersection define a line along which the dough may be folded to form the pastry. Further, one of the circles is made larger than the other of the circles so that when the filling is placed on the smaller of the circles, that portion of the dough formed by the larger of the circles overlaps the smaller of the circles while accommodating the filling and eliminating the need to stretch the dough. The unique shape of the cutting frame defines an area for the placement of the filling, defines a fold line, and further eliminates the need to stretch the shell about the filling to provide folded pastries of uniform size and thickness which are easily formed.

The pastry tool also includes a flange which extends inwardly from the frame, a distance above the cutting edge so that it may be used to seal two layers of dough together to provide a positive seal while minimizing the width of the rim. Because the unique shape of the shell cut out by the pastry tool is such that it eliminates the need to stretch the dough to accommodate a filling and further forms a pastry with one flat surface, the sealing flange of the tool is easy to use. The height of the sealing flange is adjustable so that varying thicknesses of dough may be sealed. Further, sealing and trimming of the rim are accomplished simultaneously by the sealing flange and cutting edge of the frame to reduce time and work in forming the pastry These and other objects and advantages of the invention, as well as the details of an illustrative embodiment, will be more fully understood from the following description and from the drawings.

BEST MODE FOR CARRYING OUT THE INVENTION

Figure 4:
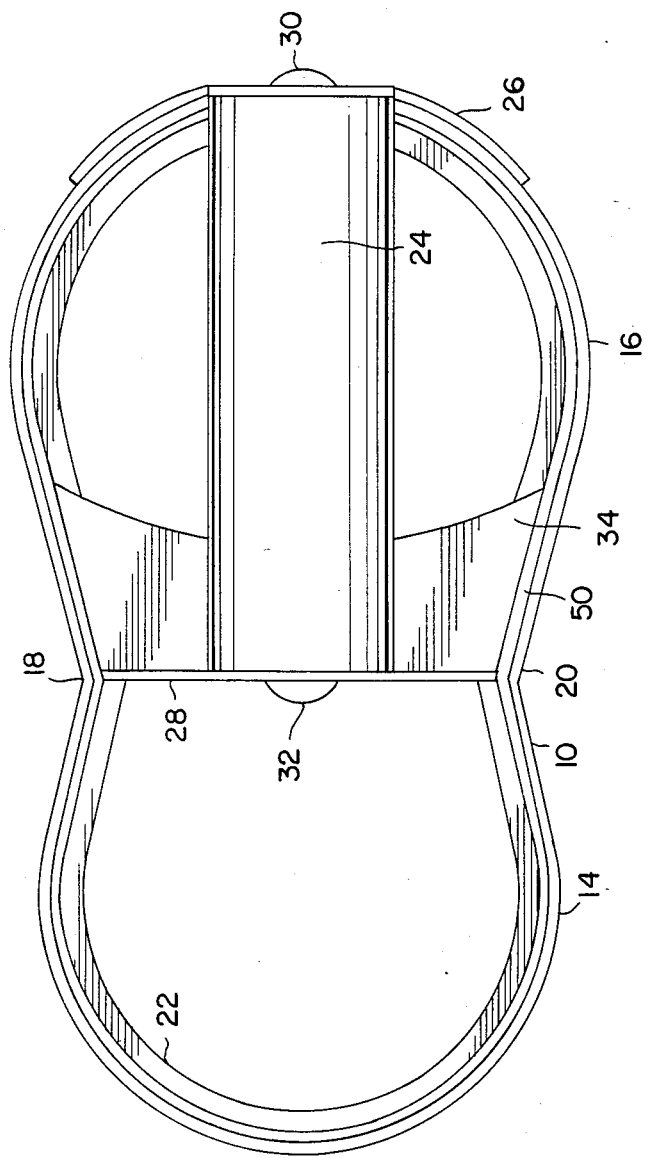
FIG. 4 is a top view of the pastry tool of FIG. 1.

The pastry tool 10 of the present invention as shown in FIGS. 1–6 includes a frame 10 having an edge 12 for cutting rolled-out dough, the frame being made of aluminum so that it is easy to clean and sufficiently strong so as not to bend or warp. As shown in FIG. 4, the frame 10 is formed having two substantially circular sections 14 and 16 wherein the diameter of the section 16 is slightly larger than the diameter of the section 14 so as to facilitate folding of the dough cut by the tool as discussed below. The frame and cutting edge are formed in the shape of the peripheral outline of a pair of circles respectively forming sections 14 and 16, the circles intersecting at two points 18 and 20 to define a line for folding the dough cut by the tool.

The pastry tool also includes a flange 22 extending inwardly from the frame a distance above the cutting edge to seal two layers of the dough together. Although the sealing flange 22 is shown extending about the entire inner surface of the frame 10, it is sufficient that the flange extend from one of the points of intersection 18, along the interior of that portion of the frame forming the smaller circular section 14 to the other point of intersection 20 as will be apparent.

The pastry tool also includes a handle 24 which is secured between a rear bracket 26 and a front bracket 28 by means of respective screws 30 and 32. A center bracket 34 extends rearwardly from the lower edge of the front bracket 28 and includes a pair of downwardly extending flanges, such as flange 36 shown in FIG. 6, each of the flanges being secured to the frame 10 by means of a pair of screws. The handle 24 extends from the fold line defined by points 18 and 20 to the rear of the pastry tool so that the view of the front section 14 of the frame 10 is unobstructed to facilitate the cutting of the rolled-out dough and the sealing and trimming of the pastry.

Figure 5:
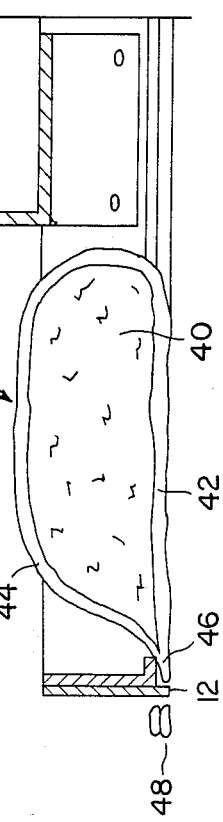
FIG. 5 is a partial cross-section of the pastry tool of FIG. 1 illustrating the trimming and sealing of a folded pastry.

The pastry tool of the present invention is used to form a folded pastry 38 as shown in FIG. 5 as follows. The pastry tool is used with rolled-out dough like a cookie cutter, the edge 12 of the frame 10 cutting the dough to form a shell, the outline of which is the same as the edge 12 with the shape of the peripheral outline of a pair of circles intersecting at two points coinciding with the points 18 and 20 of the tool which points define a fold line for the shell. After the shell is cut, a spoonful of filling 40 is placed in the middle of the smaller circular section 42 formed by the frame section 14. That portion of the shell 44 formed by the larger frame section 16 is folded over the filling so that its outer edge is coincident with the outer edge of the shell section 42 underlying the filling. Because the shell section 44 is larger than the shell section 42, it need not be stretched to bring its edge coincident with the edge of the smaller shell section 42 while accommodating the filling 40.

As shown in FIG. 5, after the pastry shell has been folded over the filling, the pastry tool is used to seal the pastry rim while simultaneously trimming the rim. In order to seal and trim the pastry, the smaller section 14 of the pastry tool is placed over the folded pastry and pressed down. The sealing flange 22 presses the top and bottom layers of the shell together to form a rim 46 while the cutting edge 12 of the front section 14 simultaneously trims any excess dough 48 from the rim. The sealing flange 22 and cutting edge 12 provide a positive seal while minimizing the side of the rim 48, the width of which is equal to the width of the flange 22.

Figure 3:
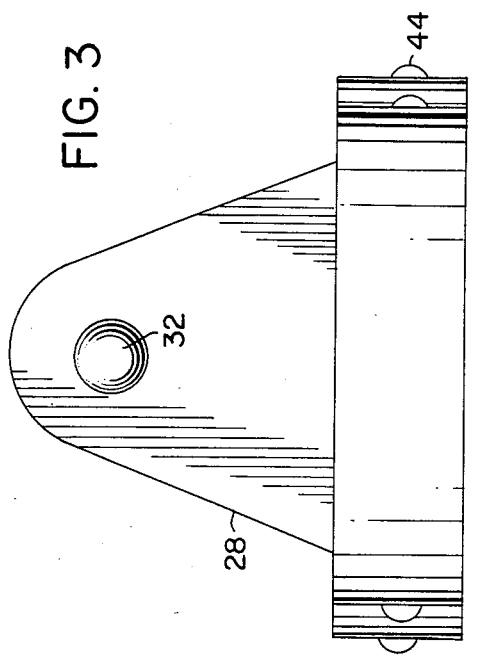
FIG. 3 is a front elevation of the pastry tool of FIG. 1.
Figure 2:
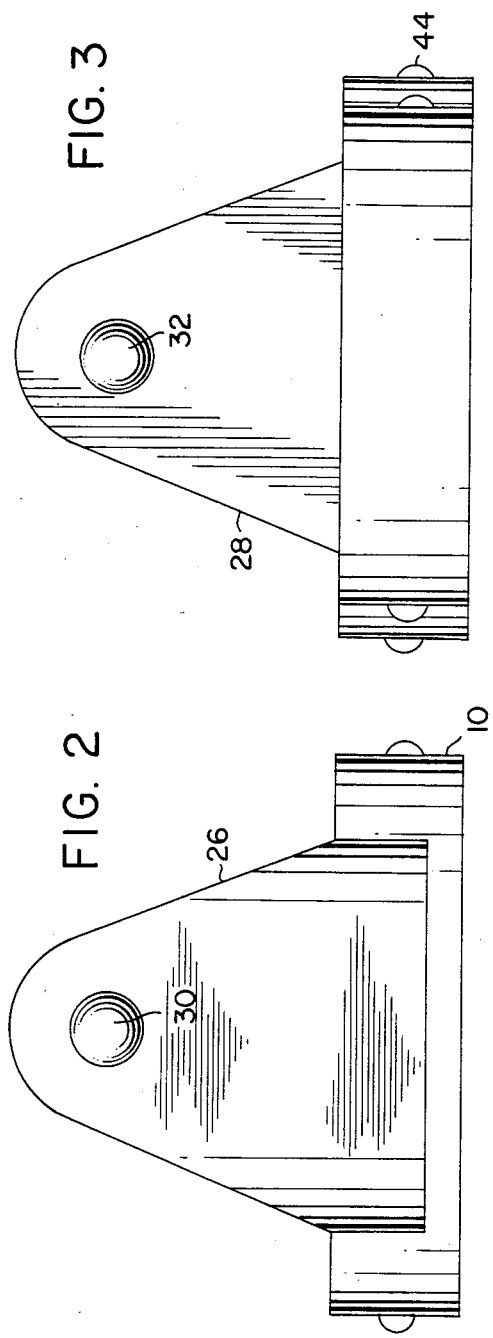
FIG. 2 is a rear elevation of the pastry tool of FIG. 1.
Figure 1:
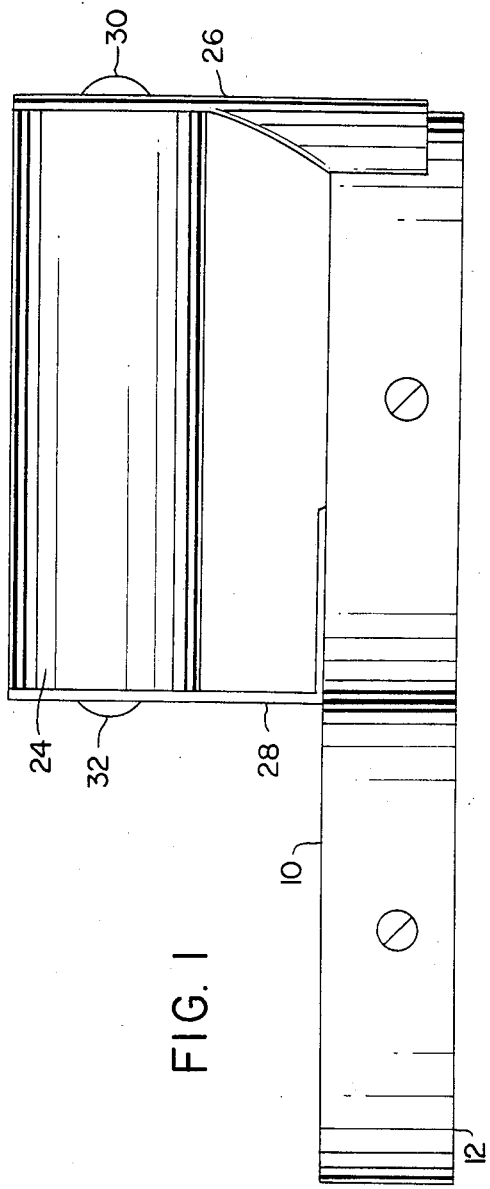
FIG. 1 is a side elevation of the pastry tool of the present invention.
Figure 6:
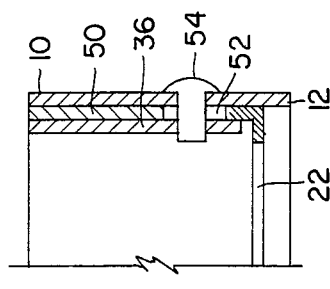
FIG. 6 is a cross-section of the frame of the pastry tool illustrating the adjustable sealing flange.

In order that the pastry tool may be used with doughs of varying thickness, the sealing flange 22 may be made adjustable as shown in FIG. 6. The sealing flange 22 extends inwardly from a member 50 which extends about the interior of the frame 10. The member 50 includes a plurality of holes such as the hole 52 through which a screw 54 may extend to secure the member 50 and flange 22 to the frame 10. The screw 54 also extends through a hole formed in the flange 36 of the center bracket 34, the screw 54 being secured by a wing nut or the like, not shown. In order to adjust the height of the flange relative to the cutting edge 12, the holes 52 are made elongated. To adjust the height, the screw 54 is first loosened and the member 50 is moved to adjust the height of the flange 22. After which a wing nut is tightened on the screw 54 so that the member 40 is firmly held in place between the flange 36 and frame 10.

The dimensions of the circular sections 14 and 16 of the frame 10 are made such that the pastry tool may be used with a standard food scoop such as used with ice cream or to make melon balls and the like. The diameter of the smaller section 14 is made approximately 1 inch larger than the diameter of the food scoop with which the pastry tool is to be used and the diameter of the larger section 16 is made approximately 1 inch larger than the diameter of the section 14 of the frame 10. More specifically, if the pastry tool is to be used with a food scoop having a diameter of $2\frac{1}{4}''$, so as to provide a ball of filling having that diameter, the section 14 should have a diameter of approximately $3\frac{1}{4}''$ and the diameter of the section 16 should be approximately $4\frac{1}{4}''$. Because the pastry tool may be sized relative to the amount of filling to be used, the size and shape of the pastry may be made uniform which is essential when the folded pastries are to be made on a commercial basis.

I claim:

1. An apparatus for forming a folded pastry from rolled-out dough, comprising:
   a frame having an edge for cutting the dough, said cutting edge formed in the shape of the peripheral outline of a pair of circles intersecting at two points, the two points of intersection defining a line for folding the dough to form said pastry.

2. The apparatus of claim 1 wherein the diameter of one of said circles is larger than the diameter of the other of said circles to allow that portion of the dough formed by the larger of said circles to overlap the smaller of said circles while accommodating a filling therebetween.

3. The apparatus of claim 2 wherein the diameter of the larger of the circles is approximately 1 inch greater than the diameter of the smaller of the circles.

4. The apparatus of claim 1 further including a flange extending inwardly from said frame a distance above the cutting edge to seal two layers of dough together.

5. The apparatus of claim 4 wherein said sealing flange extends at least from one of said points of intersection along the interior of that portion of the frame forming one of said circles to the other point of intersection.

6. The apparatus of claim 5 wherein the diameter of one of said circles is larger than the diameter of the other of said circles and said sealing flange extends along that portion of the frame forming the smaller of the circles.

7. The apparatus of claim 4 wherein the distance of the sealing flange above the cutting edge is adjustable.

8. The apparatus of claim 4 further including a handle connected to said frame and extending from the line defined by said points of intersection, across one of said circles, to the outer periphery of that one circle.

9. An apparatus for forming a folded pastry from rolled-out dough, said pastry having a filling therein formed substantially in a semi-sphere, the apparatus comprising:
   a frame having an edge for cutting the dough, said cutting edge formed in the shape of the peripheral outline of a pair of circles intersecting at two points, the two points of intersection defining a line for folding the dough to form said pastry and the radius of one of said circles being approximately one-half inch greater than the radius of the semi-sphere of filling.

10. The apparatus of claim 9 wherein the radius of the other of said circles is approximately one inch greater than the radius of the semi-sphere of filling.

* * * * *